Patented Oct. 19, 1926.

1,603,945

UNITED STATES PATENT OFFICE.

FRED E. FRAIR AND LEANDER S. FRAIR, OF EAST WALLINGFORD, VERMONT.

MEDICINAL PREPARATION FOR TREATMENT OF SCOURS.

No Drawing. Application filed November 8, 1924. Serial No. 748,754.

Our invention relates to medicinal preparations for the treatment of domestic animals and more particularly relates to remedies for the treatment for the diarrheal disease in cows and calves commonly known as "scours", and which unless immediately checked is liable to the loss of the animal affected. The loss of calves to dairymen and breeders of fine cattle from this disease is very considerable even with the use of such remedies as are known to veterinaries. The compound of our present invention has been proved by actual use in a large number of cases to be highly efficacious in the treatment of scours so much so as to check the disease and permit recovery of the calf in practically all of the large number of cases treated.

The essential element in our compound is the extract or infusion of the common hardhack or steeplebush. This infusion is made by steeping the dry blossoms or the seeds of the plant in water. Preferably we take the blossoms in the proportion of about 1 ounce to 1 quart of water and allow them to steep in the water at or about boiling heat for 3 hours.

To the infusion thus formed we add, when cold, sweet spirits of nitre and quinine (quinine sulphate) in the proportions of one-third of an ounce of sweet spirits of nitre and three and one-third grains of quinine to each ounce of the infusion.

This mixture should be administered as soon as the symptoms of the disease are recognized. The dose should depend somewhat on the age of the calf or cow. For a calf from one to two months old the dose should be ½ ounce of the mixture and may be repeated in 2 hours. For older calves and for cows the dose may be increased to at least twice the amount.

We do not, of course, desire to be limited to the proportions stated.

Having thus described our invention what we claim is:—

1. A medicinal preparation for the treatment of scours in cows and calves consisting of an infusion of hardhack, sweet spirits of nitre and quinine.

2. A medicinal preparation for the treatment of scours in cows and calves consisting of an infusion of hardhack, sweet spirits of nitre and quinine in the proportions of infusion of hardhack one ounce, sweet spirits of nitre one-third ounce and three and one-third grains of quinine.

In testimony whereof, we hereunto affix our signatures.

FRED E. FRAIR.
LEANDER S. FRAIR.